(12) United States Patent
Koropoff

(10) Patent No.: US 11,307,922 B2
(45) Date of Patent: Apr. 19, 2022

(54) APPLICATION CRASH ANALYSIS TECHNIQUES WHEN MEMORY DUMP AND DEBUG SYMBOLS ARE NOT CO-LOCATED

(71) Applicant: EMC IP Holding Company LLC, Hopkinton, MA (US)

(72) Inventor: Brian Koropoff, Bellevue, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/160,021

(22) Filed: Jan. 27, 2021

(65) Prior Publication Data
US 2021/0149759 A1    May 20, 2021

Related U.S. Application Data

(62) Division of application No. 16/260,526, filed on Jan. 29, 2019, now Pat. No. 10,929,216.

(51) Int. Cl.
| | |
|---|---|
| *G06F 11/00* | (2006.01) |
| *G06F 11/07* | (2006.01) |
| *G06F 11/36* | (2006.01) |
| *H04L 67/00* | (2022.01) |
| *G06F 8/41* | (2018.01) |

(Continued)

(52) U.S. Cl.
CPC ............ *G06F 11/0778* (2013.01); *G06F 8/41* (2013.01); *G06F 8/61* (2013.01); *G06F 11/0715* (2013.01); *G06F 11/0784* (2013.01); *G06F 11/366* (2013.01); *G06F 40/169* (2020.01); *H04L 67/34* (2013.01)

(58) Field of Classification Search
CPC ............ G06F 11/0778; G06F 11/0715; G06F 11/0784; G06F 11/366; G06F 11/0706; G06F 11/0793; G06F 11/079; G06F 11/362
See application file for complete search history.

(56) References Cited

U.S. PATENT DOCUMENTS

| | | |
|---|---|---|
| 4,953,084 A | 8/1990 | Meloy et al. |
| 6,684,389 B1 | 1/2004 | Tanaka et al. |
| 9,727,448 B1 * | 8/2017 | Seibert, Jr. ............ G06F 11/368 |

OTHER PUBLICATIONS

Notice of Allowance received for U.S. Appl. No. 16/260,193, dated Oct. 22, 2020, 18 pages.

\* cited by examiner

*Primary Examiner* — Katherine Lin

(74) *Attorney, Agent, or Firm* — Amin, Turocy & Watson, LLP

(57) ABSTRACT

Distributed architectures that can generate a crash report without concurrent access to debug symbols and a memory dump. Besides grabbing generic information from a memory dump, which most debuggers provide (e.g., call stack traces for all threads), developer-provided scripts can grab application-specific details such as tables of open protocol client connections and so-forth. This extraction can take place at a customer site where a crash occurred and can proceed without the use of debug symbols. The extraction can generate a crash report which can be sent back from the field. Once in the hands of engineering (e.g., at a provider site where debug symbols are extant but the memory dump is not), debug symbols can then be used in an annotation phase to fill in missing details (e.g., the precise source files and line numbers corresponding to call stack traces) without access to the original crash dump.

20 Claims, 10 Drawing Sheets

(51) Int. Cl.
*G06F 8/61* (2018.01)
*G06F 40/169* (2020.01)

APPLICATION CRASH ANALYSIS TECHNIQUES WHEN MEMORY DUMP AND DEBUG SYMBOLS ARE NOT CO-LOCATED

RELATED APPLICATION

The subject patent application is a divisional of, and claims priority to, U.S. patent application Ser. No. 16/260,526, filed Jan. 29, 2019, and entitled "APPLICATION CRASH ANALYSIS TECHNIQUES WHEN MEMORY DUMP AND DEBUG SYMBOLS ARE NOT CO-LOCATED," the entirety of which application is hereby incorporated by reference herein.

TECHNICAL FIELD

The present application relates generally to techniques for application crash analysis and more particularly to crash analysis when only one of memory dump data and debug symbols is available at a particular location.

BACKGROUND

When an application crashes, the developer or application provider can attempt to diagnose the error. Successful diagnoses of the error that caused the crash can lead to improvements of the application. Non-trivial crash analysis typically requires concurrent access to both memory dump data and debug symbols.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
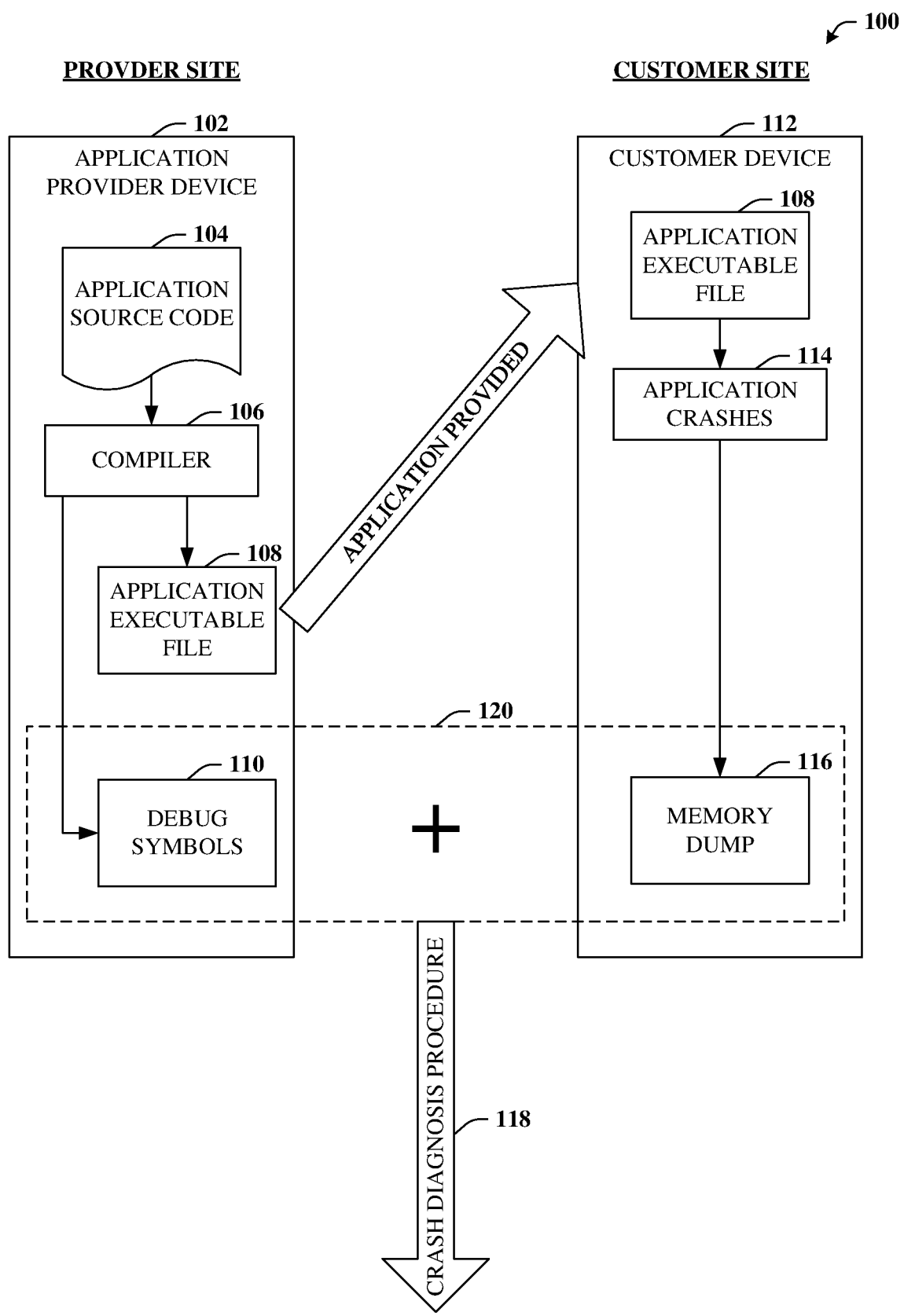
FIG. 1 illustrates at a high level an example distributed architecture that demonstrates a logistical issue for crash diagnosis in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates system 100 that demonstrates a logistical issue for crash diagnosis in accordance with certain embodiments of this disclosure. In this example, consider two geographically or topologically disparate locations: a provider site comprising one or more application provider device 102, and a customer site comprising one or more customer device 112. As used herein, "provider" is intended to refer to as an entity that develops or provides an application. "Customer" is intended to refer to an entity that uses or executes the application.

Initially, the provider can develop source code, which can be input to compiler 106 and/or linker. In response, compiler 106 outputs application executable file 108 and associated debug symbols 110 for that application that can be employed by a debugger to diagnose application crashes. For example, debug symbols can include additional information that can access code of other resources relied upon by the application. Typically, these steps occur at the provider site.

The customer (e.g., at the customer site) can receive application executable file 108, which can be deployed and executed on customer device 112. If the application crashes, illustrated by reference numeral 114, memory dump 116 is generated.

As detailed in the Background section, non-trivial crash analysis, such as crash diagnosis procedure 118, typically requires concurrent access to both debug symbols 110 and memory dump data 116, which is illustrated by box 120. However, as depicted, a common scenario is one in which debug symbols 110 are located at the provider site, where application source code 104 was compiled, whereas memory dump 116 is located at the customer site, where the application was being executed and crashed, creating a logistical issue.

When confronted with this scenario, conventional systems typically take one of two approaches aimed at bringing memory dump 116 and debug symbols 110 together where crash diagnostic procedure 118 can take place. The first approach is to package debug symbols 110 with application executable file 108 such that debug symbols 110 are available at the customer site. Thus, if the application crashes, both debug symbols 110 and memory dump 116 are available to a debugger at the customer site. This approach, however, has several drawbacks. For example, as applications become larger and more complex, the full debug symbols of a compiled application can be quite large (e.g., tens of gigabytes or more). Such represents a significant cost in terms of storage resources for the customer. Furthermore, provider technicians implement the debugger and crash diagnosis procedure 118, and the customer site is generally not the ideal location for that to occur.

Due to these and other drawbacks, a more common approach is to collect the debug symbols 110 and the memory dump 116 at a provider site, where crash diagnosis procedure 118 can commence. Of course, this second approach requires memory dump 116 be transmitted to a device of the provider such as provider device 102. However, memory dump 116 can also be extremely large. Thus, transmitting memory dump 116 to the provider site can incur a significant resource cost. Furthermore, security concerns might arise while memory dump 116 is in transit.

The disclosed subject matter can mitigate or avoid some of the above-mentioned drawbacks by taking a third approach that is distinct from approaches used in conventional systems. For example, conventional systems rely on uniting debug symbols 110 and memory dump 116 at a common location to perform crash diagnosis procedure 118. In contrast, the disclosed subject matter presents techniques by which non-trivial crash diagnosis can be provided without relying on a common location for memory dump 116 and debug symbols 110. For instance, debug symbols 110 can remain at the provider site and need not be provided to the customer site. Conversely, memory dump 116 can remain at the customer device and need not be provided to the provider site.

In that regard, in lieu of debug symbols themselves, which can be very large, a subset of application data structure information can be derived from the debug symbols and installed along with the application at customer sites. This subset of application data structure information can be chosen by a developer of the application and can allow developer-provided extraction scripts to navigate those data structures in crash dumps and pull out relevant information. This has the benefit of both being much smaller than full debug symbols (which may be prohibitively large to install at customer sites), and of disclosing fewer potential details about the implementation of provider platforms or applications than full debug symbols might.

The disclosed subject matter can comprise a framework built on a debugger (e.g., an 11 db debugger), which can extract relevant information from a userspace or kernel crash dump. Besides grabbing generic information, which most debuggers provide (e.g., call stack traces for all threads), developer-provided scripts can grab application-specific details such as tables of open protocol client connections and so-forth. This extraction can take place at a customer site where a crash occurred and can proceed without the use of debug symbols. The extraction can generate a crash report which can be sent back from the field. Once in the hands of engineering (e.g., at a provider site where debug symbols are extant), debug symbols can then be used in an annotation phase to fill in missing details (e.g., the precise source files and line numbers corresponding to call stack traces) without access to the original crash dump.

Example Systems

Figure 2:
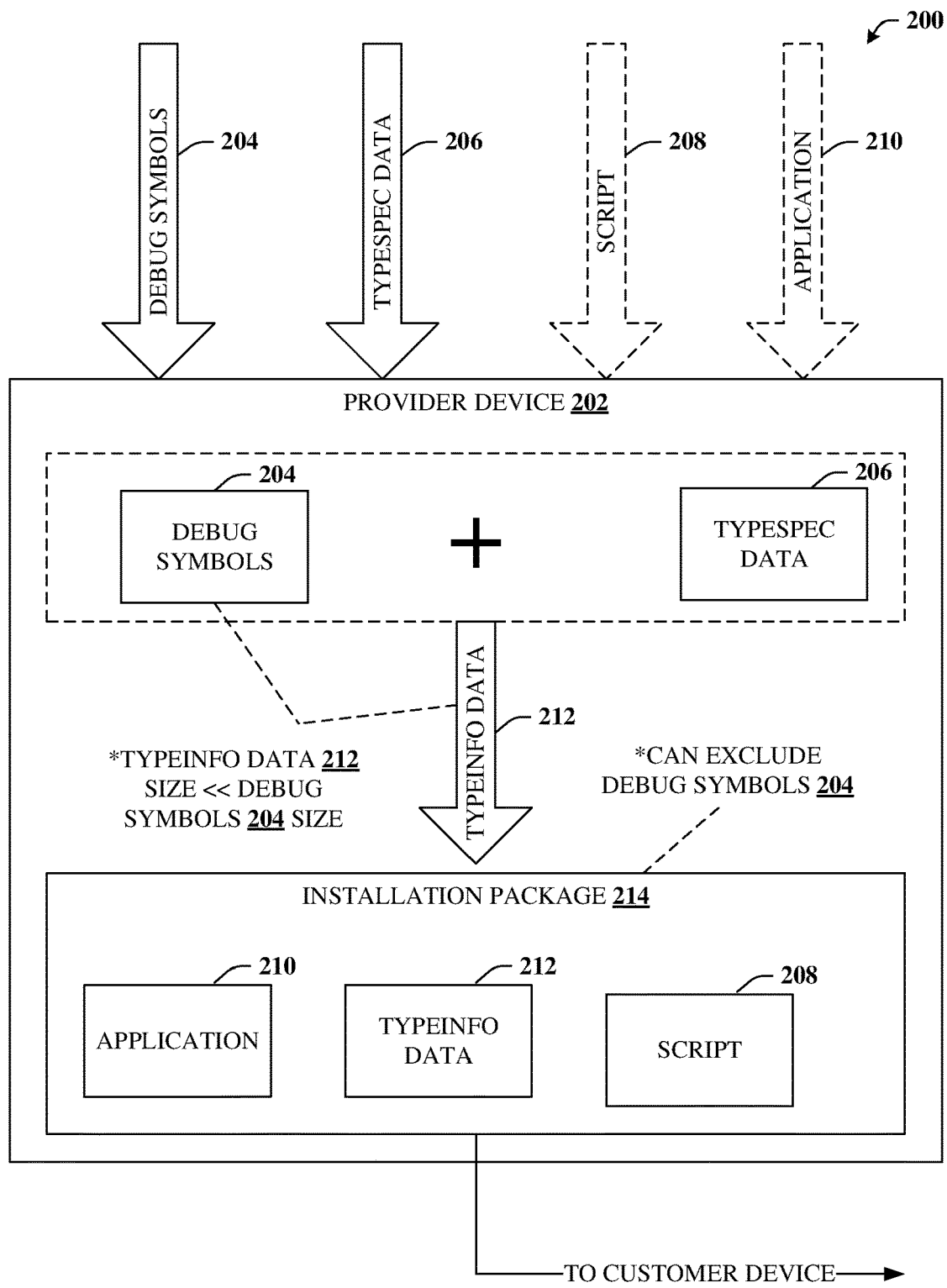
FIG. 2 depicts a block diagram of an example system comprising a provider device that can generate typeinfo data in accordance with certain embodiments of this disclosure.

Referring now to FIG. 2, a block diagram of an example system 200 is depicted. System 200 can comprise provider device 202 (e.g., at a provider site) that can generate typeinfo data in accordance with certain embodiments of this disclosure. As a brief introduction, typeinfo data can represent application-specific information that can be used in lieu of the full debug symbols at a customer site. Generally, provider device 202 (and other system of devices detailed herein) can comprise a processor and a memory that stores executable instructions that, when executed by the processor, facilitate performance of operations. Examples of the memory and processor can be found with reference to FIG. 10. It is to be appreciated that the computer 1002 can represent a server device or a client device and can be used in connection with implementing one or more of the systems, devices, or components shown and described in connection with FIG. 2 and other figures disclosed herein.

In some embodiments, provider device 202 can receive debug symbols 204. These debug symbols 204 can, for example, be generated in response to source code of an (executable) application 210 being compiled, as discussed in connection with FIG. 1. Thus, debug symbols 204 might be received from a compiler or from a data store. Further, provider device 202 can receive typespec data 206. Typespec data 206 can identify a data structure referenced by debug symbols 204. For example, typespec data 206 can identify application-specific information referenced by debug symbols 204 that is determined to be useful to diagnose a crash of application 210. In some embodiments, typespec data 206 can be specified by a developer of application 210 or specified based on input from the developer. Optionally, provider device 202 can receive script 208 and application 210. For example, in scenarios where provider device 202 generates installation package 214. In some embodiments, typespec data 206 and/or script 208 can be formatted according to a Python format or another scripting language format.

In response to applying typespec data 206 to debug symbols 204, provider device 202 can generate typeinfo data 212. Typeinfo data 212 can be representative of a configurable subset of debug symbols 204. For example, typeinfo data 212 is configurable because the subset of information included can be selected based on relevancy or usefulness in connection with diagnosing a crash. This can be distinguished from conventional debug symbols that include every possible piece of information irrespective of whether that information is specific to the application or likely to be useful in crash diagnostic.

Figure 3:
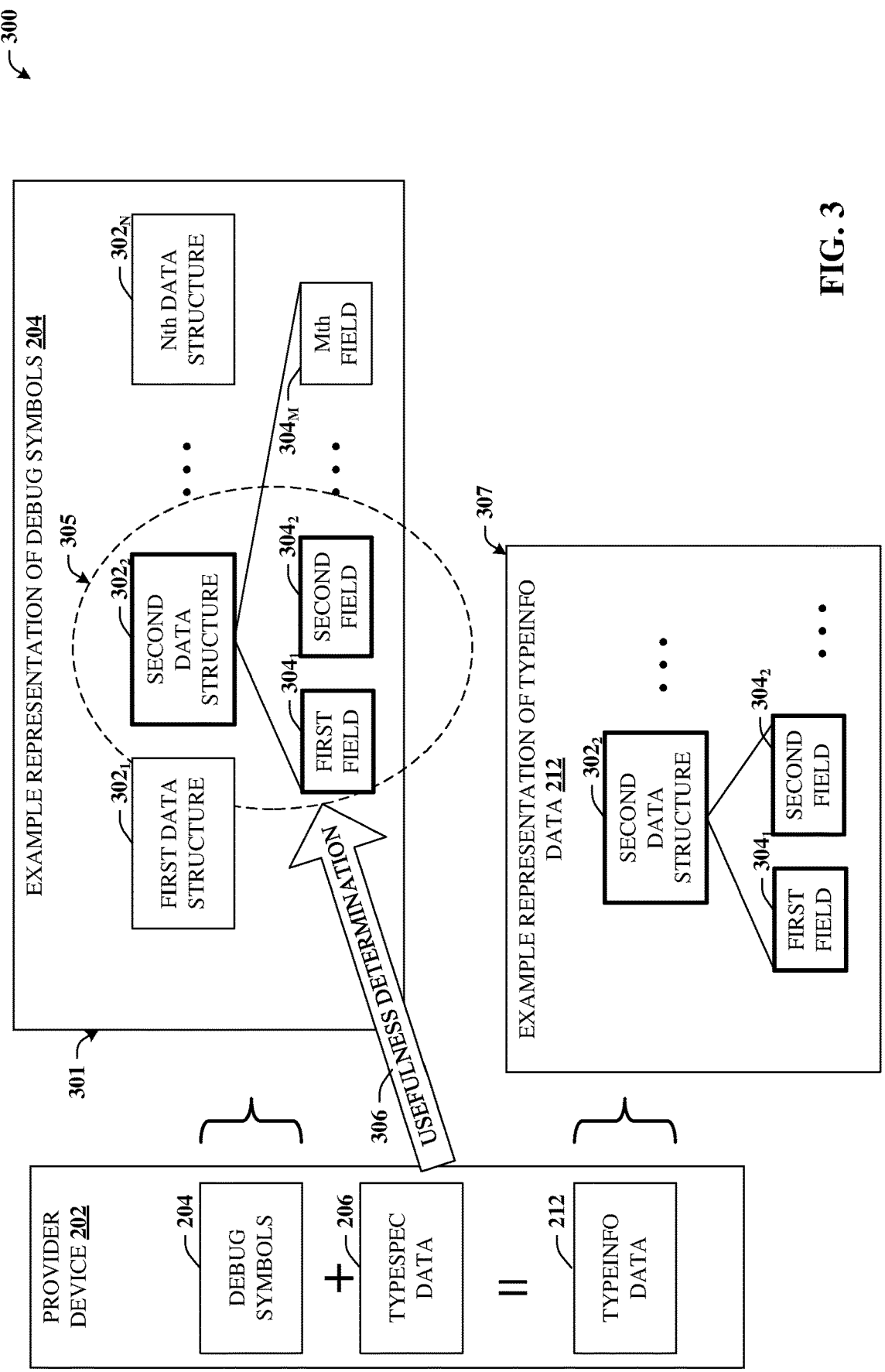
FIG. 3 depicts a block diagram of an example system comprising a provider device and illustrates additional detail in connection with typespec data and typeinfo data in accordance with certain embodiments of this disclosure.

While still referring to FIG. 2, but turning as well to FIG. 3, a block diagram of an example system 300 is depicted. System 300 can comprise provider device 202 and provides additional detail in connection with typespec data 206 and typeinfo data 212 in accordance with certain embodiments of this disclosure. As shown, provider device 202 can rely on a combination of debug symbols 204 and typespec data 206 in order to generate type info 212.

In more detail, box 301 illustrates an example representation of debug symbols 204. For instance, debug symbols 204 can include references to N data structures 302, where N can be any positive integer. As illustrated with second data structure $302_2$, each of data structure $302_1$-$302_N$ can potentially reference a set of M fields 304 that are referred to by the corresponding data structure 302, where M can be any positive integer.

Debug symbols 204 can reference thousands of data structures 302, each of which potentially referencing thousands of fields 304. Circle 305 illustrates a subset of these data structures 302 and associated fields 304 that are determined to be useful to diagnose a crash of application 210. Thus, typespec data 206 can specify, as a result of usefulness determination 306, which portions of debug symbols 204 are relevant. In the present example, those portions with enclosed by circle 305.

Box 307 illustrates an example representation of typeinfo data 212. As depicted, typeinfo data 212 includes only those elements specified by typespec data 206 and, excludes elements of debug symbols 204 that are not identified by typespec data 206.

Referring back to FIG. 2, once typeinfo data 212 has been generated, typeinfo data 212 can be provided to the customer along with application 210 and script 208. For example, in some embodiments, provider device 202 can generate installation package 214 that can be configured to install components of installation package to a customer device situated at a customer site. Thus, components of installation package 214 can include application 210 (e.g., the machine-executable code) and typeinfo data 212.

It is significant to observe that because typeinfo data 212 can represent a configurable subset of debug symbols 204, typeinfo data 212 can be much smaller than debug symbols 204. In some embodiments, typeinfo data 212 can have a data size that is an order of magnitude, or more, smaller than the data size of debug symbols 204. Advantageously, the storage burden at the customer site is thus significantly reduced over deploying the full debug symbols 204. Moreover, installation package 214 can include script 208. Script 208 can comprise instruction for extracting from a memory dump, relevant information identified by typeinfo data 212. In other words, script 208 can represent the logic for extracting the relevant information. In some embodiments, script 208 can be generated based on input from a developer of application 210.

Figure 4:
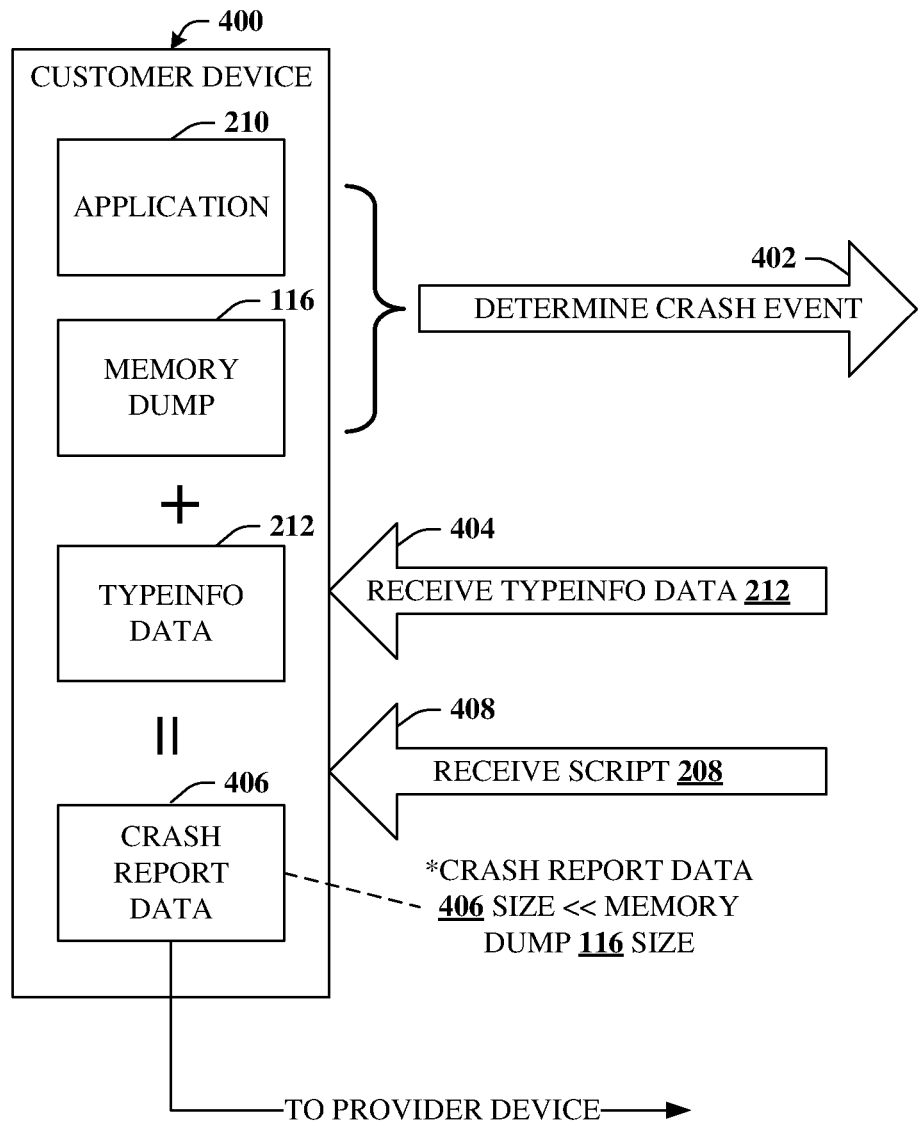
FIG. 4 illustrates a block diagram of an example customer device that can generate crash report data in accordance with certain embodiments of this disclosure.

Turning now to FIG. 4, a block diagram of an example customer device 400 is depicted. Customer device 400 (e.g., at a customer site and thus without local access to debug symbols 204) can generate crash report data 116 in accordance with certain embodiments of this disclosure. For example, consider that application 210 is being executed by customer device 400 at the customer site when the application crashes, referred to herein as a crash event. As a result of the crash event, memory dump 116 is generated by the associated customer device operating system. This memory dump 116 can be representative of a state of the memory at a time of the crash event. Customer device 400 can make determination 402 that a crash event has occurred.

In response to determination 402 that a crash event occurred, customer device 400 can retrieve typeinfo data 212. Recall, typeinfo data 212 (e.g., generated at the provider site) can be representative of a configurable subset of debug symbols 204, determined by applying typespec data 206 to debug symbols 204. Recall further that debug symbols 204 were generated in response to compiling source code for application 210. In other words, while the debug symbols 204 are not extant at, or locally accessible to, customer device 400, customer device 400 can have access to typeinfo data 212. In some embodiments, typeinfo data 212 can be configured to include application-specific elements of the debug symbols 204 that were determined, potentially by a developer of application 210, to be useful in diagnosing a crash event.

In some embodiments, customer device 400 can further retrieve script 208, for example, a developer-provided script comprising instructions and/or logic for extracting, from memory dump 116, relevant information identified by typeinfo data 212. Thus, in response to applying typeinfo data 212 to memory dump 116, customer device 400 can generate crash report data 406. Crash report data 406 can be representative of a portion of memory dump 116 that is extracted in accordance with typeinfo data 212 and script 208.

For example, crash report data 406 can comprise a name of a function being executed at the time of the crash event and a machine code offset. In some embodiments, e.g., in response to debug symbols not being extant at the customer site, crash report 406 can exclude source file location information that specifies a line of the source code being executed at the time of the crash event. In other words, crash report data 406 can represent a tailored, application-specific substitute for memory dump 116. For example, crash report data 406 can include application-specific information such as a table of all connected clients. In some embodiments, crash report data 406 can be formatted according to a JavaScript object notation (JSON) format or another data-interchange format.

Advantageously, a data size of crash report data 406 can be significantly smaller than a data size of memory dump 116. For example, in some embodiments, a data size of crash report data 406 can be at least an order of magnitude smaller than a data size of memory dump 116. Thus, the reduced-size crash report data 406 can be transmitted to a device of the provider (e.g., provider device 202), where debug symbols are available.

It is appreciated that techniques detailed above are substantially distinct from previous solutions. For example, previous solutions relied upon the memory dump and debug symbols being co-located to generate crash report details. In contrast, the disclosed subject matter generates crash report data 406 without memory dump 116 and debug symbols 204 being co-located. Given the enormous size of modern day memory dumps and debug symbols, which is expected to grow further in the future, such can improve the feasibility of, and reduce resource utilization in connection with, application crash analysis.

It is further appreciated that in some embodiments, 400 customer device in which the application is executing at the time of the crash can be the same customer device 400 that makes determination 402 and/or generates crash report data 406, as depicted. In other embodiments (not shown), it is understood that a different customer device 400 can make determination 402 and/or generate crash report data 406, that is, different from the customer device 400 executing application 210 at the time of the crash.

Figure 5:
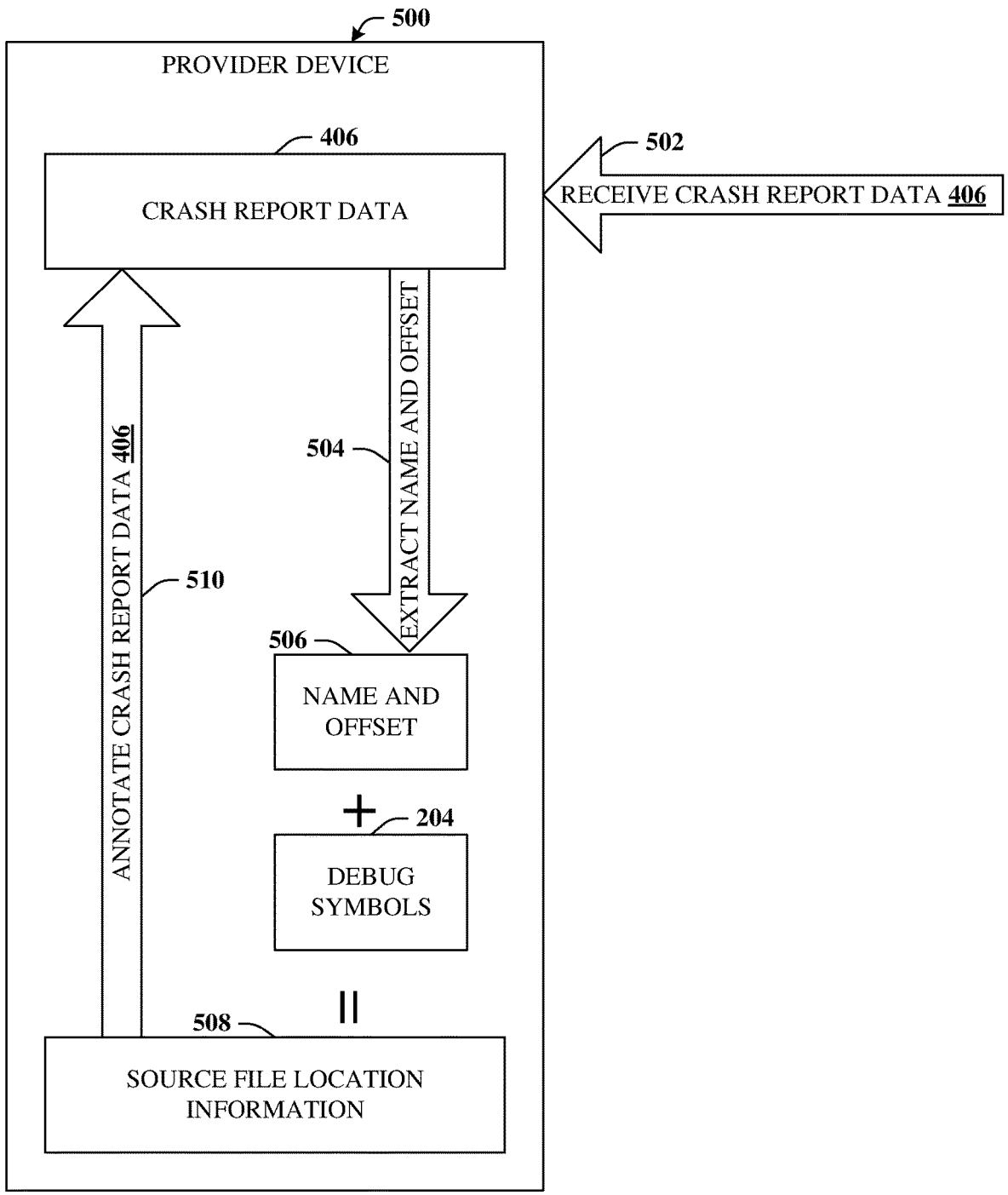
FIG. 5 illustrates a block diagram of an example provider device that can annotate crash report data with information determined to be useful to diagnose an application crash in accordance with certain embodiments of this disclosure.

With reference not to FIG. 5, a block diagram of an example provider device 500 is depicted. Provider device 500 (e.g., at a provider site and thus without local access to memory dump 116) can annotate crash report data with information determined to be useful to diagnose an application crash in accordance with certain embodiments of this disclosure. It is appreciated that provider device 500 can be the same device or a different device from provider device 202 of FIG. 2.

Regardless, as illustrated by reference numeral 502, provider device 500 can receive crash report data 406, from customer device 400. As detailed, crash report data 406 can be generated in response to debug symbols 204 not being locally available to customer device 400. Crash report data 406 can representative of an application-specific portion of memory dump 116 that was determined to be useful to crash diagnosis and is much smaller in size than memory dump 116.

Provider device 500 can extract, from crash report data 406, details about a function being executed at a time that crash event occurred at the customer site. For example, provider device 500 can extract function name and offset data 506. As detailed, because the customer site did not have access to debug symbols 204, name and offset data 506 does not include reference to a line of source code being executed at the time of the crash event. However, provider device 500 does have local access to debug symbols 204. Thus, in response to applying debug symbols 204 to crash report data 406, provider device can annotate 510 crash report data 406 with source file location information 508 that specifies the line of source code being executed at the time of the crash event.

Example Methods

Figure 6:
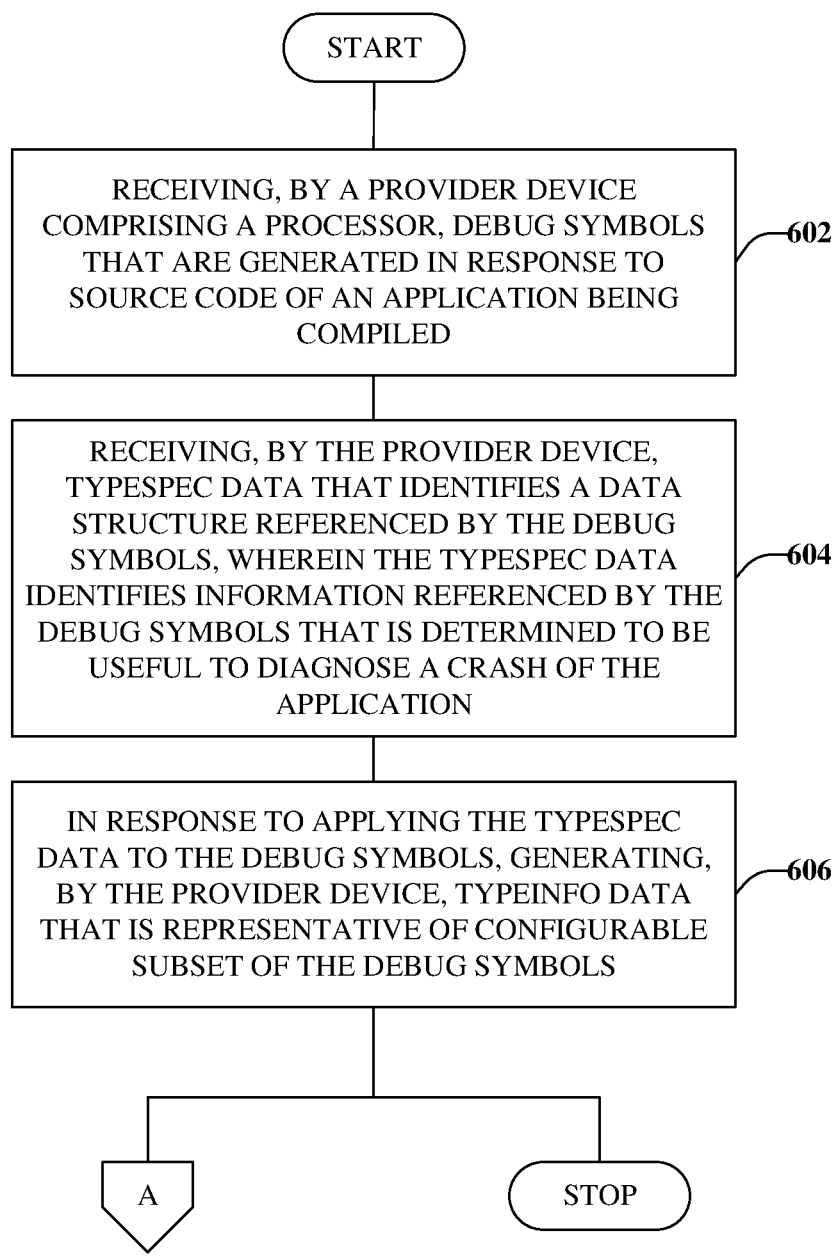
FIG. 6 illustrates an example methodology that can generate typeinfo data in accordance with certain embodiments of this disclosure.
Figure 7:
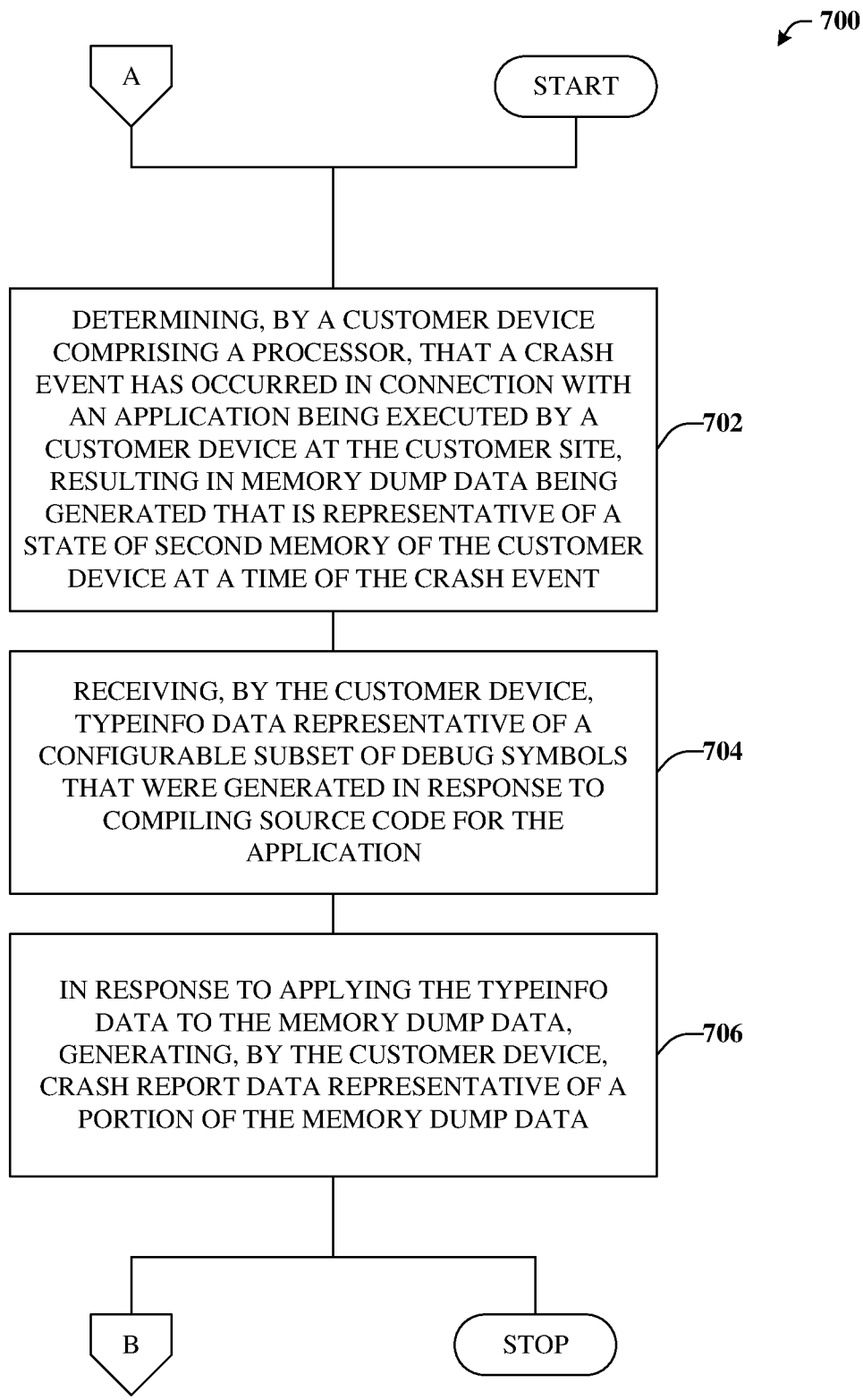
FIG. 7 illustrates an example methodology that can extract crash report data from a memory dump in accordance with certain embodiments of this disclosure.
Figure 8:
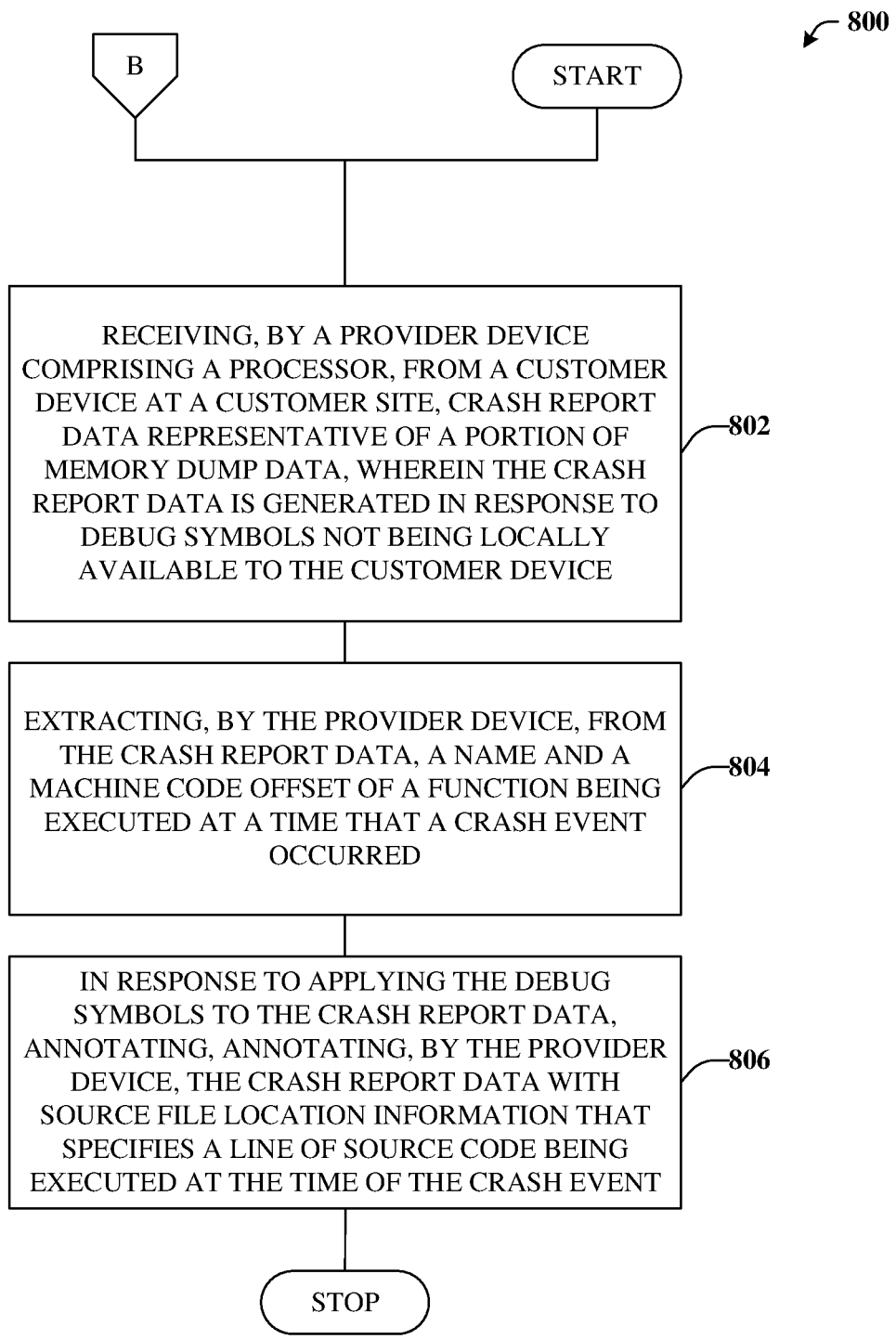
FIG. 8 illustrates an example methodology that can annotate crash report data with information determined to be useful to diagnose an application crash in accordance with certain embodiments of this disclosure.

FIGS. 6-8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Developer Phase Method

Turning now to FIG. 6, exemplary method 600 representative of a developer phase is depicted. Method 600 can generate typeinfo data in accordance with certain embodiments of this disclosure. For example, at reference numeral 602, a provider device comprising a processor can receive debug symbols. The debug symbols can be generated in response to source code of an application being compiled.

At reference numeral 604, the provider device can receive typespec data. The typespec data can identify a data structure referenced by the debug symbols. For example, the typespec data can identify information referenced by the debug symbols that is determined to be useful to diagnose a crash of the application. A determination as to information that is useful to diagnose the crash can be based on input received from a developer of the application.

In response to applying the typespec data to the debug symbols, typeinfo data can be generated at reference numeral 606. Typeinfo data can thus be representative of configurable subset of the debug symbols that is determined to be useful to diagnose a crash of the application. As depicted, method 600 can proceed to insert A, which is further detailed in connection with FIG. 7, or stop.

Extraction Phase Method

Turning now to FIG. 7, exemplary method 700 representative of an extraction phase is depicted. Method 700 can extract crash report data from a memory dump in accordance with certain embodiments of this disclosure. While method 700 describes a complete methodology, in some embodiments, method 700 can continue from method 600, as illustrated by insert A.

At reference numeral 702, a customer device comprising a processor can determine that a crash event has occurred in connection with an application being executed by a customer device at the customer site. As a result of the crash event, the operating system of the customer device can generate dump data. Dump data can be representative of a state of a memory of the customer device at a time of the crash event.

At reference numeral 704, the customer device can retrieve typeinfo data. Recall, typeinfo data can be representative of a configurable subset of debug symbols. This configurable subset can be application-specific fields and data structures that were deemed to be useful to diagnose a crash of the application. Recall further that debug symbols were generated in response to compiling source code for the application. Thus, while the debug symbols are not available at the customer site, the typeinfo data is available.

Hence, the type info data, potentially along with a script specifying logic for extracting relevant information from the dump data, can be employed to extract useful information. For example, at reference numeral 706, the customer device can generate crash report data representative of a portion of the memory dump data determined to be useful for crash diagnosis. Generating crash report data can be in response to applying the typeinfo data to the memory dump data. As depicted, method 700 can proceed to insert B, which is further detailed in connection with FIG. 8, or stop.

Annotation Phase Method

Turning now to FIG. 8, exemplary method 800 representative of an annotation phase is depicted. Method 800 can annotate crash report data with information determined to be useful to diagnose an application crash in accordance with certain embodiments of this disclosure. While method 800 describes a complete methodology, in some embodiments, method 800 can continue from method 700, as illustrated by insert B.

At reference numeral 802, a provider device comprising a processor can receive crash report data. The crash report data can be received from a customer device at a customer site, where debug symbols are not locally available. The crash report data can be representative of a portion of memory dump data that was determined to be useful for crash diagnosis.

At reference numeral 804, the provider device can extract, from the crash report data, a name and a machine code offset of a function being executed at a time that a crash event occurred. At reference numeral 806, in response to applying the debug symbols to the crash report data, the provider device can annotate the crash report data with source file location information that specifies a line of source code being executed at the time of the crash event.

Example Operating Environments

Figure 9:
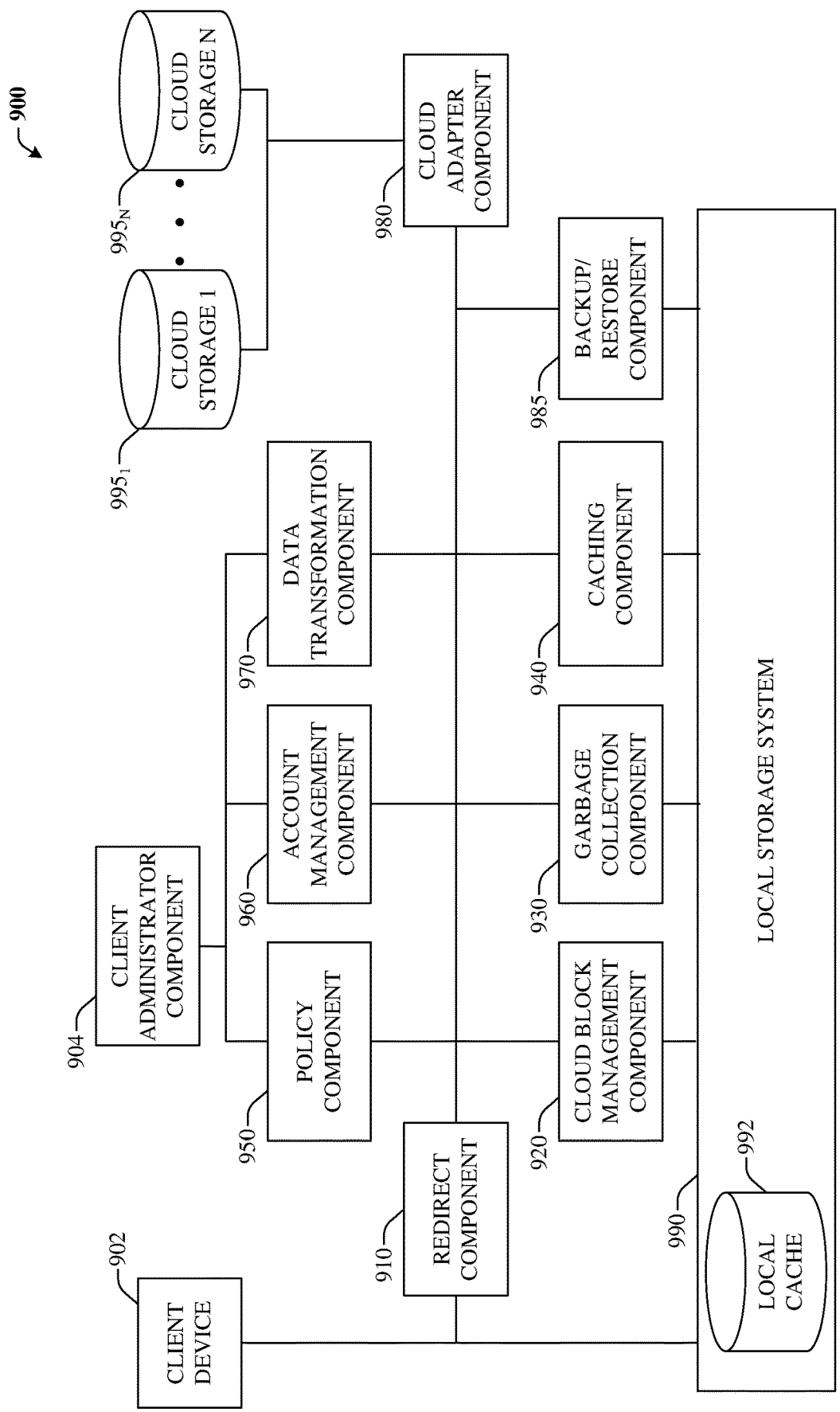
FIG. 9 illustrates a block diagram of an example distributed file storage system that employs tiered cloud storage in accordance with certain embodiments of this disclosure.
Figure 10:
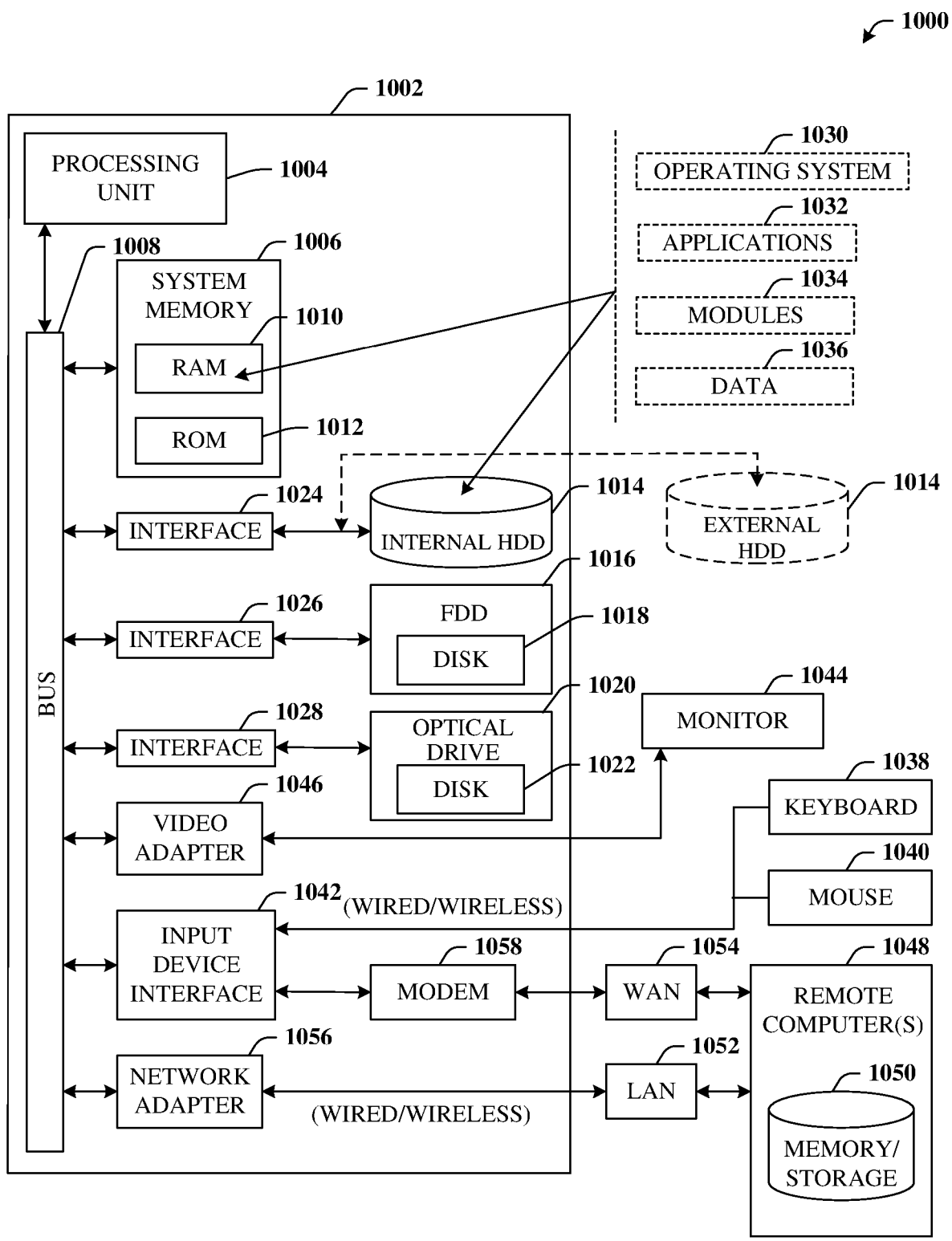
FIG. 10 illustrates an example block diagram of a computer operable to execute certain embodiments of this disclosure.

To provide further context for various aspects of the subject specification, FIGS. 9 and 10 illustrate, respectively, a block diagram of an example distributed file storage system 900 that employs tiered cloud storage and block diagram of a computer 1002 operable to execute the disclosed storage architecture in accordance with aspects described herein.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well.

As more fully described below with respect to redirect component 910, redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 may use an interface to access the policy component 950 and the account management component

960 for operations as more fully described below with respect to these components. Data transformation component 970 can operate to provide encryption and compression to files tiered to cloud storage. Cloud adapter component 980 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 997 can be utilized to back up the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 960 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on list of mappings it manages. For example, each stub can be associated with an account, and the cloud block management component 920 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of APIs. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 940 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 997 can transfer a copy of the files within the local storage system 990 to another cluster (e.g., target cluster). Further, the backup/restore component 997 can manage synchronization between the local storage system 990 and the other cluster, such that, the other cluster is timely updated with new and/or modified content within the local storage system 990.

Referring now to FIG. 10, there is illustrated a block diagram of a computer 1002 operable to execute the disclosed communication architecture. To provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), and/or device(s) disclosed herein can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random-access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touch screen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least Wi-Fi and Bluetooth® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and outdoors; anywhere within the range of a base station. Wi-Fi networks use radio technologies called IEEE 1002.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a memory that stores computer executable components; and
    a processor that executes computer executable instructions stored in the memory, wherein the computer executable instructions comprise:
        prior to receiving, from a customer device at a customer site, crash report data representative of a portion of memory dump data, compiling source code of an application, resulting in an executable file of the application and debug symbols associated with the application;
        receiving the crash report data, wherein the crash report data is generated in response to the debug symbols being determined not to have been locally available to the customer device;
        extracting, from the crash report data, a name and a machine code offset of a function being executed at a time that a crash event occurred; and
        in response to applying the debug symbols to the crash report data, annotating the crash report data with source file location information that specifies a line of the source code of the application being executed at the time of the crash event.

2. The system of claim 1, wherein the memory dump data is generated at the customer site in response to the crash event being determined to have occurred during execution of the application at the customer site.

3. The system of claim 1, wherein the processor is situated at a provider site that excludes the memory dump data other than the portion, and wherein a first size of the portion is at least an order of magnitude smaller than a second size of the memory dump data.

4. The system of claim 1, wherein the operations further comprise, prior to the receiving of the crash report data, transmitting the executable file of the application to the customer device and storing the debug symbols to a provider data store that is local to the system.

5. The system of claim 1, wherein the operations further comprise determining typespec data that identifies a data structure referenced by the debug symbols, and wherein the typespec data identifies information referenced by the debug symbols that has been determined, according to a defined criterion, to be useful to diagnose a crash of the application.

6. The system of claim 5, wherein the operations further comprise, in response to applying the typespec data to the debug symbols, generating typeinfo data that is representative of configurable subset of the debug symbols.

7. The system of claim 6, wherein the operations further comprise transmitting an installation package to the customer device, wherein the installation package comprises the executable file of the application and the typeinfo data, and wherein the installation package excludes the debug symbols that are not included in the configurable subset represented by the typeinfo data.

8. The system of claim 7, wherein a first size of the debug symbols is at least an order of magnitude larger than a second size of the typeinfo data.

9. The system of claim 7, wherein the installation package further comprises script data indicative of instructions for extraction of relevant information identified by the typeinfo data from the memory dump data.

10. The system of claim 9, wherein the script data is determined during generation of the source code of the application.

11. The system of claim 9, wherein the script data is determined or updated following the compiling of the source code of the application.

12. The system of claim 9, wherein the script data is determined by a creator of the application.

13. A non-transitory computer-readable medium comprising instructions that, in response to execution, cause a system comprising a processor to perform operations, comprising:
  prior to receiving, from a customer device at a customer site, crash report data representative of a portion of memory dump data, compiling source code of an application, resulting in an executable file of the application and debug symbols associated with the application;
  receiving the crash report data, wherein the crash report data is generated in response to the debug symbols not being locally available to the customer device;
  extracting, from the crash report data, a name and a machine code offset of a function being executed at a time that a crash event occurred; and
  in response to applying the debug symbols to the crash report data, annotating the crash report data with source file location information that specifies a line of the source code of the application being executed at the time of the crash event.

14. The non-transitory computer-readable medium of claim 13, wherein the memory dump data is generated at the customer site in response to the crash event having occurred during execution of the application at the customer site.

15. The non-transitory computer-readable medium of claim 13, wherein the processor is located at a provider site that excludes the memory dump data other than the portion, and wherein a first size of the memory dump data is at least a defined order of magnitude larger than a second size of the portion of the memory dump data.

16. The non-transitory computer-readable medium of claim 15, wherein the portion is specified by typeinfo data that is representative of a configurable subset of the debug symbols that was generated in response to compiling the source code for the application.

17. A method, comprising:
  prior to receiving crash report data, compiling, by a device comprising a processor, source code, the compiling resulting in generation of an executable file of an application and debug symbols associated with the application;
  receiving, by the device, the crash report data from a customer site, wherein the crash report is representative of a portion of memory dump data and the crash report data is generated in response to the debug symbols not being locally available to the customer device;
  extracting, by the device and from the crash report data, a name and a machine code offset of a function being executed at a time that a crash event occurred; and
  in response to applying the debug symbols to the crash report data, annotating, by the device, the crash report data with source file location information that specifies a line of the source code of the application being executed at the time of the crash event.

18. The method of claim 17, further comprising, prior to receiving the crash report data, transmitting, by the device, the executable file of the application to the customer device and storing the debug symbols to a provider data store that is local to the device.

19. The method of claim 17, further comprising determining, by the device, typespec data that identifies a data structure referenced by the debug symbols, wherein the typespec data identifies information referenced by the debug symbols that has been determined to be useful to diagnose a crash of the application.

20. The method of claim 19, further comprising, in response to applying the typespec data to the debug symbols, generating, by the device, typeinfo data that is representative of configurable subset of the debug symbols.

* * * * *